United States Patent [19]

Philippe

[11] Patent Number: 4,885,673
[45] Date of Patent: Dec. 5, 1989

[54] DEMAGNETIZATION MONITORING DEVICE FOR A SWITCHING POWER SUPPLY WITH A PRIMARY AND A SECONDARY REGULATION

[75] Inventor: Maige Philippe, Seyssinet Parizet, France

[73] Assignee: SGS-Thomson Microelectronics S.A., Gentilly, France

[21] Appl. No.: 301,525

[22] Filed: Jan. 23, 1989

[30] Foreign Application Priority Data

Jan. 21, 1988 [FR] France ............................. 88 00885

[51] Int. Cl.⁴ ........................................... H02M 3/335
[52] U.S. Cl. ........................................ 363/21; 363/97; 358/190; 315/411
[58] Field of Search .................. 363/20, 21, 97, 131; 358/190; 315/411

[56] References Cited

U.S. PATENT DOCUMENTS

| | | | |
|---|---|---|---|
| 3,909,696 | 9/1975 | Katou et al. | 363/21 |
| 4,063,307 | 12/1977 | Stephens | 363/21 |
| 4,459,651 | 7/1984 | Fenter | 363/21 |
| 4,692,852 | 9/1987 | Hoover | 363/21 |
| 4,731,655 | 3/1988 | Lee et al. | 358/190 |

FOREIGN PATENT DOCUMENTS 0251551 1/1988 European Pat. Off. .
WO86/07214 12/1986 World Int. Prop. O. .

Primary Examiner—Peter S. Wong
Attorney, Agent, or Firm—Lowe, Price, LeBlanc, Becker & Shur

[57] ABSTRACT

A switching power supply comprises a primary regulation system (CI3) and a secondary regulation system (CI2, CI1), supplying control signals (Pp, Ps) for a main switch (TP) and further comprises a comparison means (22), the output of which (Is) is set to "1" when the transformer (TA) of the switching current is demagnetized. A logic circuit (CL) receives the output signals (Is, Pp, Ps) and supplies on its output (25) a control signal (VS5) for the main switch (Tp) which can be set to "0" for the switching OFF of the main switch or to "1" for its switching ON, as a function of the following criteria: the control signal is set to "1" if the comparator output signal is set to "1", and if the output signal of at least one of the regulators is set to "1", and the control signal is set to "0" when the regulator output signal which has caused to control signal to be set to "1" is set to "0".

3 Claims, 5 Drawing Sheets

DEMAGNETIZATION MONITORING DEVICE FOR A SWITCHING POWER SUPPLY WITH A PRIMARY AND A SECONDARY REGULATION

BACKGROUND OF THE INVENTION

The instant invention relates to stabilized power supply, so-called switching power supplies.

A switching power supply operates in the following way. A transformer primary winding receives a current which is for example supplied by a rectifying bridge receiving energy from the mains. The current in the transformer is chopped by a switch (for example a power transistor) in series with the primary winding.

A transistor control circuit establishes periodical square pulses for setting on the transistor. During the occurrence of the square pulses, the current is allowed to flow; outside those square pulses, the current flow is not allowed.

An ac voltage is then obtained on one (or several) secondary winding(s) of the transformer. This voltage is rectified and filtered for supplying a d.c. voltage which is the output d.c. voltage of the switching power supply.

In order to stabilize the value of this d.c. voltage, one acts upon the duty cycle of the switch periodical conduction, that is, upon the ratio between the ON and OFF state durations within a switching period.

FIG. 1 shows an examplary switching power supply architecture manufactured by the Applicant wherein two integrated circuits are used. One of those circuits, CI1, serves to control the base of a power transistor Tp for applying switching ON and switching OFF periodical signals thereon. This base control circuit CI1 is positioned on the primary winding side (EP) of the transformer (TA). The other integrated circuit, the regulation circuit CI2, is on the contrary positioned on the secondary side (winding ES1) and it serves to determine the output voltage VS1 of the power supply for elaborating regulation signals that it transmits to the first integrated circuit through a small insulating transformer TX. The first integrated circuit CI1 uses those regulation signals for modifying the duty cycle of the switching transistor Tp and therefore adjusting the output voltage Vs of the power supply.

Referring to FIG. 1, one can see the supply transformer TA, the primary winding EP of which is fed in A1 by an electric current, supplied for example by a rectifying bridge connected to the mains. The other extremity of the primary winding EP is connected to the collector of a switching transistor Tp, the emitter of which is connected to the primary ground (designated in the drawings by a black triangle).

The transformer is provided with several secondary windings which are preferably insulated from the mains and connected for example to a secondary ground insulated from the primary ground.

Each of the secondary windings has an extremity connected to the secondary ground. The other extremity of each secondary winding feeds a low-pass filtering capacitor through a rectifying diode.

Later on, only one secondary winding ES1, connected through a diode 10 to a capacitor 11, will be considered. The d.c. voltage of the switching power supply is the voltage VS1 through the terminals of capacitor 11; but, of course, other output d.c. voltages are liable to be obtained through the terminals of other filtering capacitors connected to secondary windings through rectifying diodes. Those output voltages constitute stabilized supply voltages for utilization circuits, not shown. By way of example, a secondary winding ES2 supplies a supply voltage stabilized at a few volts for feeding the regulation integrated circuit CI2 hereinabove mentioned. The circuit CI2 receives on its input the voltage VS1, the value of which is compared with a reference value applied to a pulse-width modulator which sets variable width periodical square pulses as a function of the output voltage value VS1; the lowest the VS1 value is, the larger the width of the square pulses will be.

The square pulses are set to the switching frequency of the switching power supply. This frequency is thus set on the secondary circuit side; it is generated either inside the circuit CI2, or at the outside of a circuit not shown, in the form of a saw-tooth voltage at the chosen switching frequency, connected to the circuit CI2 on a terminal 12. This saw-tooth voltage is besides used in a known manner for determining the pulse-width modulation (PWM).

The variable width square pulses supplied by the regulation circuit CI2 at its output 13 are applied to a primary winding 14 of a small transformer TX, the secondary winding 15 of which, insulated from the primary, supplies variable width square pulses. Those pulses, having a position and a frequency determined by the regulation circuit CI2, are the regulation signals applied to an input 16 of the control circuit CI1.

The transformer TX is constituted by a few windings rolled on a ferrite rod, the windings of the primary and those of the secondary being sufficiently spaced apart from one another to comply with the standards of galvanic insulation between the primary and secondary circuits of the switching power supply.

The control integrated circuit CI1 comprises means known per se designed to constitute at its output 17 variable width periodical square pulses precisely reproducing the signals supplied in 13 by the regulation circuit CI2. Those signals supplied in 17 by the circuit CI1 are applied to the base of the switching transistor Tp.

The circuit CI1 is energized in A3 by any known means, and is connected to the primary ground.

Such a switching power supply is liable to be advantageously used in a TV set. In such a case, it is advantageous that the saw-tooth voltage applied in 12 to the circuit CI2 be synchronized with the horizontal scanning frequency so that the switching transistor Tp be switched ON at the spot retrace, in order that the spurious pulses generated by the switching ON of the transistor do not appear on the picture.

Another mode of regulating a switching power supply is shown in FIG. 2. This other regulation mode is called primary regulation because it is operated through a circuit CI3 located on the primary side.

In FIG. 2, one can see, similarly to FIG. 1, the supply transformer TA comprising a primary winding EP fed by a rectified current and connected to the collector of a switching transistor Tp, the emitter of which is connected to the primary ground. Each of those secondary windings ES1 and ES2 supplies electric currents which, after rectification and filtering, constitute the power supplies one wishes to get stabilized. The regulation system is constituted by another secondary winding ES3, an extremity of which is connected to the primary ground and the other extremity to the input 18 of the circuit CI3. The voltage applied on the input 18 is compared, in the circuit CI3, with a reference value and is applied on a pulse-width modulator which sets variable width electrical square pulses as a function of the voltage value applied on 18. The square pulses are set to the switching frequency of the switching power supply. This frequency is therefore et on the primary side of the circuit; it is generated in the form of a saw-tooth voltage at a chosen switching frequency.

This primary regulation system presents the advantage of being simple to implement, since it does not necessitate either an auxiliary transformer TX or a shaping circuit for the transformer output signal.

But, such a primary regulation system presents the drawback of a poorer regulation quality, as well as major difficulties for obtaining a synchronization between the switching frequency and another frequency resulting from the operation of a device energized on the secondary side, for example of a device corresponding to the horizontal scanning of a TV set.

For various reasons, especially resulting from the choice to be made between the regulation performances and the cost of the components, it appears more and more advantageous, for example for a TV set, to use a switching current comprising both a primary and a secondary regulation system. As regards a TV set, the primary regulation is used when the set is operating in a standby mode, and the secondary regulation is used when the TV set is operating in a normal mode. The primary regulation is set so as to stabilize the power supply at a value lower than that of the secondary regulation. Thus, when the TV set is normally operating, one of the outputs VS1 of the stabilized power supply is liable for example to supply a 124 volts voltage, and when the TV set is in the standby mode, said output VS1 is liable to supply a voltage of about 100 volts. Of course, the other outputs VS2, etc., provide voltages that vary in the same ratios according to the operating mode.

If a switching power supply is thus comprising both a primary and a secondary regulation, a switching power supply system has to be provided comprising not only the circuits such as described in FIG. 1 but also those described in FIG. 2. It is noticeable, in such a case, that the base of the switching transistor Tp is to be connected both to an output 17 of the circuit CI1 and to an output 19 of the circuit CI3, for example through an OR gate.

When the TV set is in the standby mode, the primary regulation device only is operating and the circuit CI3 alone supplies the signals to the base of the switching transistor Tp. When the TV set is operating normally, the primary and secondary regulation devices are simultaneously operating, but since the primary regulation is set in order to stabilize a voltage lower than that of the secondary regulation, the circuit CI3 does not supply any output signal since, at its input 18, it detects a higher voltage than the reference voltage, and the secondary regulation circuit CI2 alone supplies output signals provided for controlling, through the circuit CI1, the base of the switching transistor Tp.

But, such a switching power supply system, which seems to operate properly in a stable standby or normal operation mode, presents faulty operations during the transition phase from one operating condition to another or if an overvoltage occurs during its functioning, causing the output voltage to rapidly drop. Indeed, during those transition phases or during those abrupt and accidental overvoltages, a simultaneous supply of signals from the primary and secondary regulation circuits is liable to occur for a short lapse of time on the base of the switching transistor Tp. The simultaneous occurrence of signals from the primary and secondary regulation circuits (which are not synchronized), is liable to cause the switching ON of the switching transistor Tp at periods when the demagnetization of the transformer TA is not completed; and it is known, in such a case, that the switching transistor is exposed to be damaged due to the fact that the switching ON is carried out while the collector is at a too high voltage and the switching transistor is, besides, liable to allow a higher current than the normal current to flow.

The instant invention relates to a device permitting, in any circumstances, on the one hand, to ensure the full demagnetization of the supply transformer TA between successive switching ON transitions and, on the other hand, to avoid too high currents to flow.

SUMMARY OF THE INVENTION

The instant invention therefore relates to a switching power supply comprising both a primary and a secondary regulation system, each of those two regulation systems being liable to supply at the output signals constituted by variable-width square pulses, each of those signals being capable of being set to a logic "0" corresponding to a swithing OFF order of a main switch and a logic "1" corresponding to a switching ON order of this main switch.

According to the invention, this switching power supply comprises:

- a comparison means, with respect to a low or null voltage value, for the output voltage of a secondary winding, the output of the comparison means providing a logic "1" signal when the transformer of the switching power supply is demagnetized and a logic "0" signal when said transformer is not demagnetized, and
- a logic circuit receiving the output signal of the comparison means, the output signal of the primary regulator and the output signal of the secondary regulator, this logic circuit providing a control signal for the main switch, which is liable to be set to a logic "0" for switching the main switch OFF or to be a logic "1" signal for switching said switch ON, as a function of the following criteria:
  * the control signal is set to "1" if the comparator output signal is set to "1" and if the output signal of at least one of the regulators is set to "1",
  * the control signal is set to "0" when the regulator output signal, which has caused the control signal to be set to "1", is set to "0".

According to an embodiment of the instant invention, the logic circuit comprises:

- two identical flip-flop logic circuits, each of which comprising a set input S, a reset input R and a complementary output Q*,
- a first and a second AND gate, each of which being provided with two inputs, and a two-inputs OR gate.
- a set of connections so constituted that the output signal of the comparator arrives at the same time onto the inputs R of the flip-flop circuits, the outputs of the first and second AND gates being respectively connected to the inputs S of the flip-flop circuits, the outputs Q* of the flip-flop circuits being respectively connected to the inputs of the second and first AND gates, the output signal of the primary regulator arriving at the other input of the first AND gate, the output signal of the secondary regulator arriving at the other input of the second AND gate, and the outputs of both AND gates being respectively connected to the two inputs of the OR gate, the output of which corresponds to the output point of the logic circuit.

According to an embodiment of the invention, each of the flip-flop logic circuits is constituted by a D flip-flop, comprising inputs D, CK, an output Q and a complementary output Q*, a two-inputs AND gate, a two-inputs OR gate and by various connections so constituted that the input D is connected to the output Q*, the output Q is connected to one of the inputs of the AND gate, the AND gate output is connected to one of the inputs of the OR gate and the OR gate output is connected to the input CK, the other OR gate input constituting the set input S of one of the flip-flop circuits, the other input of the AND gate constituting the reset input R of the flip-flop circuit and the output Q* of the D flip-flop constituting the same output Q* of the flip-flop circuit.

BRIEF DESCRIPTION OF THE DRAWINGS

Those objects, features, advantages and others of the instant invention will clearly appear from the following detailed description of a preferred embodiment, in connection with the attached drawings, wherein.

DETAILED DESCRIPTION OF THE DRAWINGS

Figure 1:
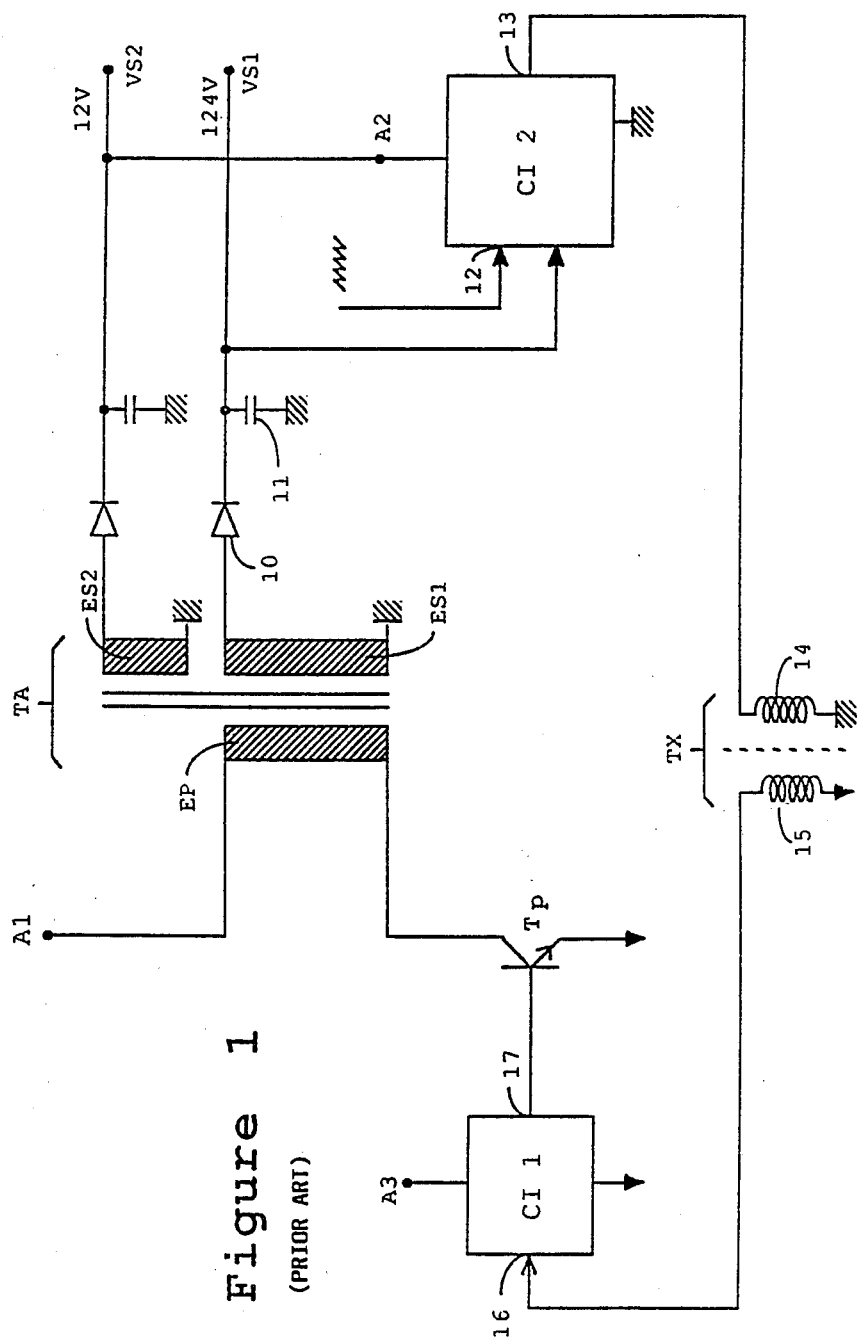
FIGS. 1 and 2 show switching power supplies according to the prior art and have been described hereinabove.
Figure 2:
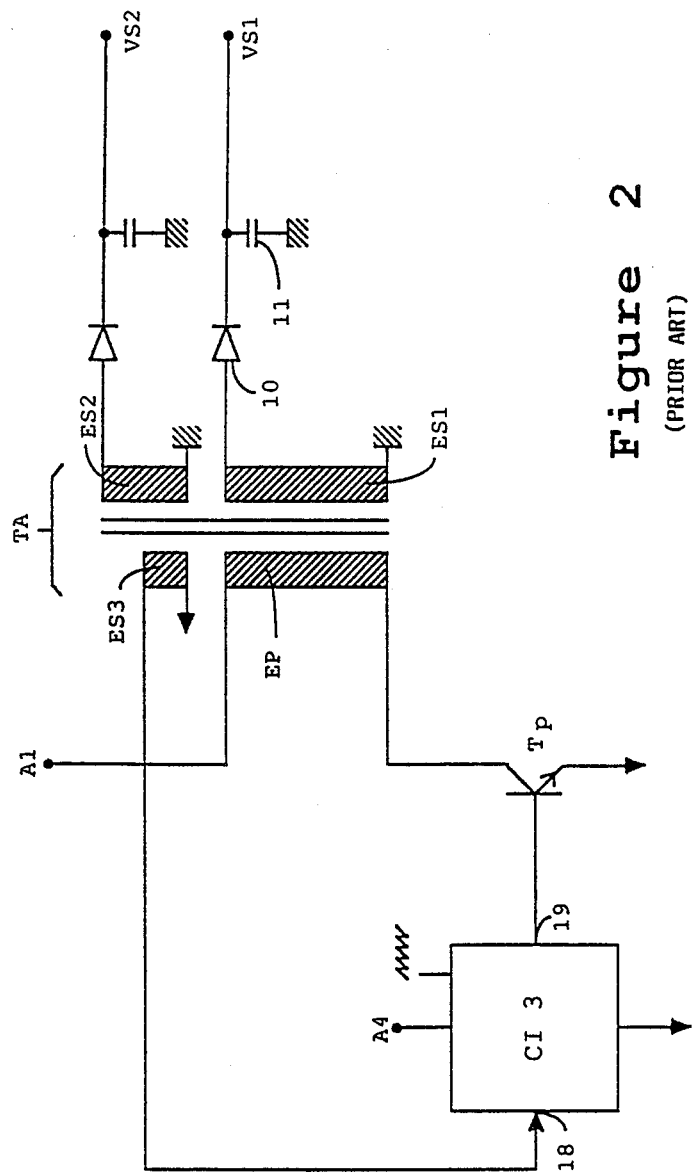
Figure 3:
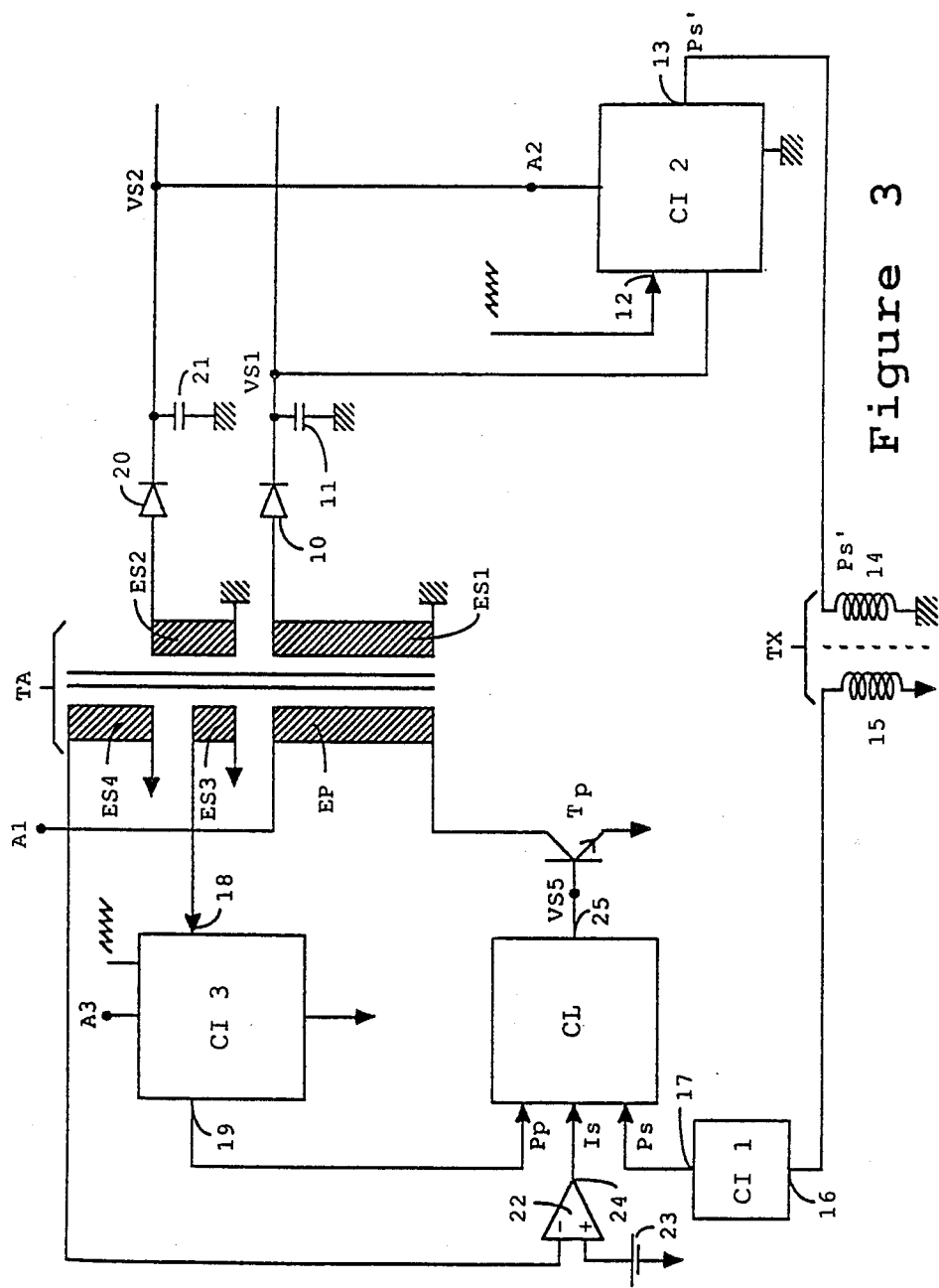
FIG. 3 is a simplified view of a switching power supply comprising a demagnetization monitoring device according to the invention.

FIG. 3 shows the current transformer TA comprising a primary winding EP, two secondary windings ES1 and ES2 each of which is connected to a secondary ground, and a secondary winding ES3 connected to a primary ground. The primary winding EP has an extremity fed in A1 by a rectified current from an ac current of the mains, and the other extremity is connected to the collector of the power transistor Tp, the emitter of which is connected to the primary ground. The secondary winding ES1 supplies an ac current with respect to the secondary ground which is rectified by a diode 10 and regulated by a capacitor 11 so as to supply at the output VS1 a 124 volts voltage, when the TV set is operating normally. The secondary winding ES2 supplies an ac current which is rectified by a diode 20 and regulated by a capacitor 21 in order to provide a 12 volts output voltage when the TV set is operating normally.

The primary regulation circuit CI3 receives on its input an electric signal supplied by the output of the secondary winding ES3, is fed by a dc current in A3 and connected to the primary ground, and supplies at its output, 19, a regulation signal $P_p$ constituted by variable width periodical square pulses as a function of the output voltage value VS3 of the secondary winding ES3; the lower VS3 is, the larger the width of the square pulses is.

A secondary regulation circuit CI2 receives as an input an electrical signal from the 124-volts supply line VS1, is fed in A2 by an electric current from the supply line VS2 (12 volts with respect to the secondary ground), and supplies at its output 13 a signal Ps' constituted by periodical pulses of variable widths as a function of the voltage value on the line VS1; the lower VS1 is, the larger the width of the square pulses will be. The square pulses are set at the switching frequency of the switching power supply. This frequency is generated in a circuit, not shown, in the form of a saw-tooth voltage at the chosen switching frequency, introduced into the circuit CI2 at point 12.

A circuit CI1 receives at the input 16 a signal provided by a secondary winding 15 of a transformer TX, the primary winding 14 of which receives the signal Ps' from the circuit CI2. The signal entering the circuit CI1 is processed so as to supply at the output 17 a signal Ps exactly corresponding to the initial signal Ps'.

A secondary winding ES4 of the transformer TA has an extremity connected to the primary ground and the other extremity connected to the input (−) of a comparator 22, the input (+) of which is connected to a positive voltage source 23 having a low value. The output 24 of the comparator 22 supplies a signal Is.

The signals Pp, Ps and Is arrive at the input of a logic circuit CL, the output 25 of which is connected to the base of the switching transistor Tp.

Figure 4:
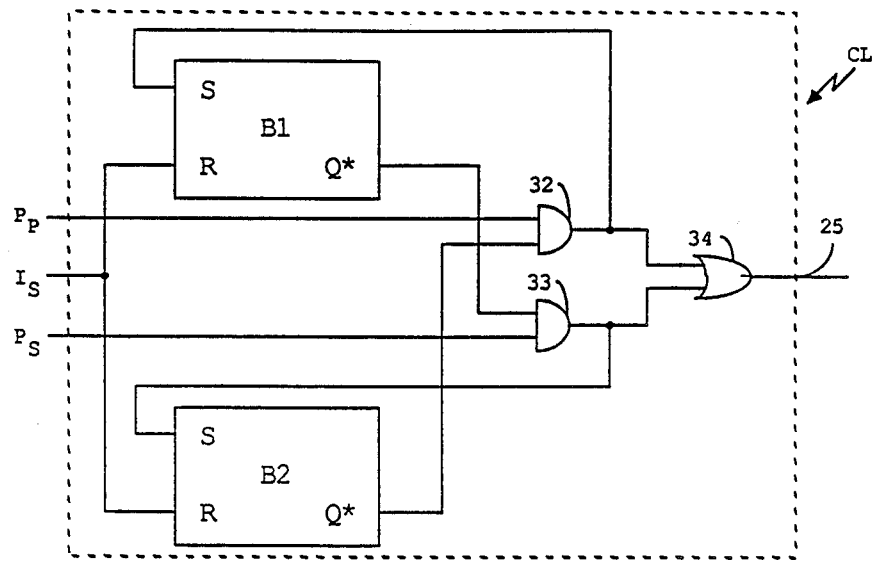
FIG. 4 shows the logic circuit according to the invention.

The logic circuit CL is described in more detail in FIG. 4. This circut CL is mainly composed of two identical RS flip-flops, B1, B2, of two AND gates 32, 33 and of an OR gate 34. Each flip-flop B1, B2 comprises a set input S, a reset input R and a complementary output Q*. The first AND gate 32 receives at its inputs, on the one hand, the signal Pp, and, on the other hand, the signal supplied by the output Q* of the flip-flop B2. The second AND gate 33 receives at its inputs, on the one hand, the signal Ps, and, on the other hand, the signal supplied by the output Q* of the flip-flop B1. The signal Is is simultaneously applied onto the reset inputs R of the flip-flops B1 and B2. The input S of the flip-flop B1 is connected to the output of the first AND gate 32, and the input S of the flip-flop B2 is connected to the output of the second AND gate 33. The respective outputs of the AND gates 32 and 33 are connected to the inputs of the OR gate 34, the output of which corresponds to point 25 of the logic circuit CL.

Figure 5:
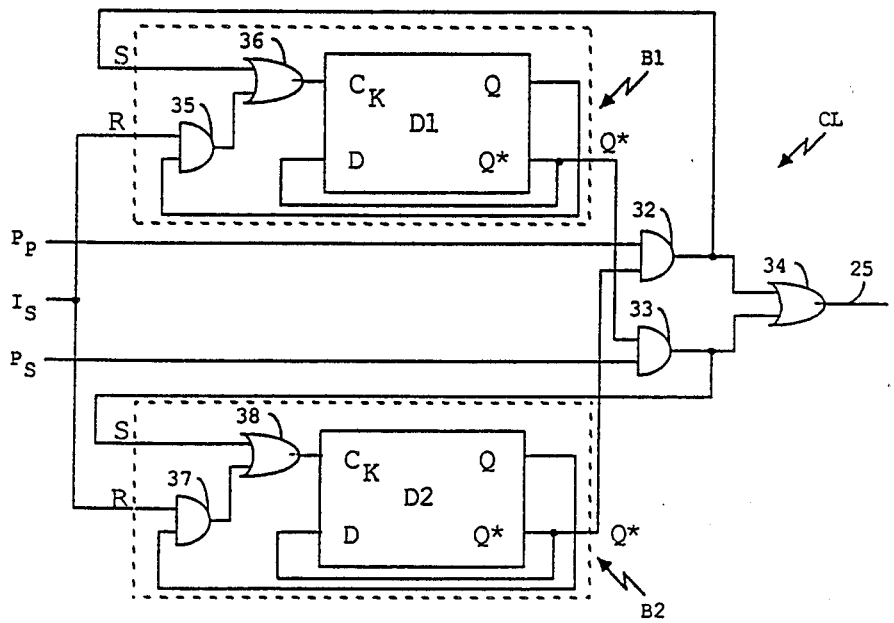
FIG. 5 shows in more detail the same logic circuit.

When the flip-flops B1 or B2 are switched ON, the corresponding outputs may be undetermined. In order to palliate this drawback, according to an embodiment of the instant invention, the flip-flop B1 can be constituted by a logic circuit comprising, as shown in FIG. 5, an AND gate 35, an OR gate 36 and a D-type flip-flop D1. The flip-flop B2 is constituted in the same way by an AND gate 37, an OR gate 38 and a D-type flip-flop D2. The input D of flip-flop D1 is connected to its complementary output Q*, the output Q is connected to an input of the AND gate 35, the output of the AND gate 35 is connected to an input of the OR gate 36, the output of which is connected to the input CK of flip-flop D1. The input S of flip-flop B1 is constituted by a second input of the OR gate 36 and the input R of flip-flop B1 is constituted by a second input of the AND gate 35. The output Q* of flip-flop D1 corresponds to the output Q* of flip-flop B1. The electrical connections of the consecutive elements of flip-flop B2 are identical to those described for flip-flop B1.

Of course, other logic circuits are liable to be devised in order to constitute the same logic functions as those previously described and which are a part of the invention.

A transformer demagnetization monitoring device such as the one illustrated in FIG. 4 (or 5) operates in the following manner.

When, at a given time, the switching transistor Tp abruptly switches over from the ON state to the OFF state, the voltage provided by the secondary winding ES4 which was negative becomes positive during the whole demagnetization phase of the transformer. When the transformer TA is demagnetized, the voltage becomes a damped sine wave and the first polarity change is detected by comparator 22 which sets its output from the logic "0" to a logic "1". The resulting logic signal Is is transmitted to the input of the logic circuit CL. The signal Is which arrives at the input of the logic circuit CL is therefore set to "1" when the feeding transformer TA is considered as being completely or quasidemagnetized. As a result, the outputs Q* of the flip-flops B1 and B2 are set to "1", which validates the AND gates 32 and 33 for receiving the first of the signals Pp and Ps which is set to "1".

Should the signal Pp be the first to be set to "1", it is transmitted by the AND gate 32 and the OR gate 34 to the output 25 of the circuit CL to switch on the switch Tp. The setting to "1" of the output of the AND gate 32 causes a signal to be applied onto the input S of flip-flop B1, which resets its output Q* to "0" and inhibits the AND gate 33. The possible occurrence of a signal Ps at a logic "1" will therefore have no effect. The conduction of the switch Tp will then be interrupted when the signal Pp is reset to "0", independently of the state of the signal Ps.

A new cycle may start again when the signal Is, which was set to "0" during the OFF state of transistor Tp (magnetization of transformer TA), is set again to "1" (demagnetization of this transformer).

Figure 6:
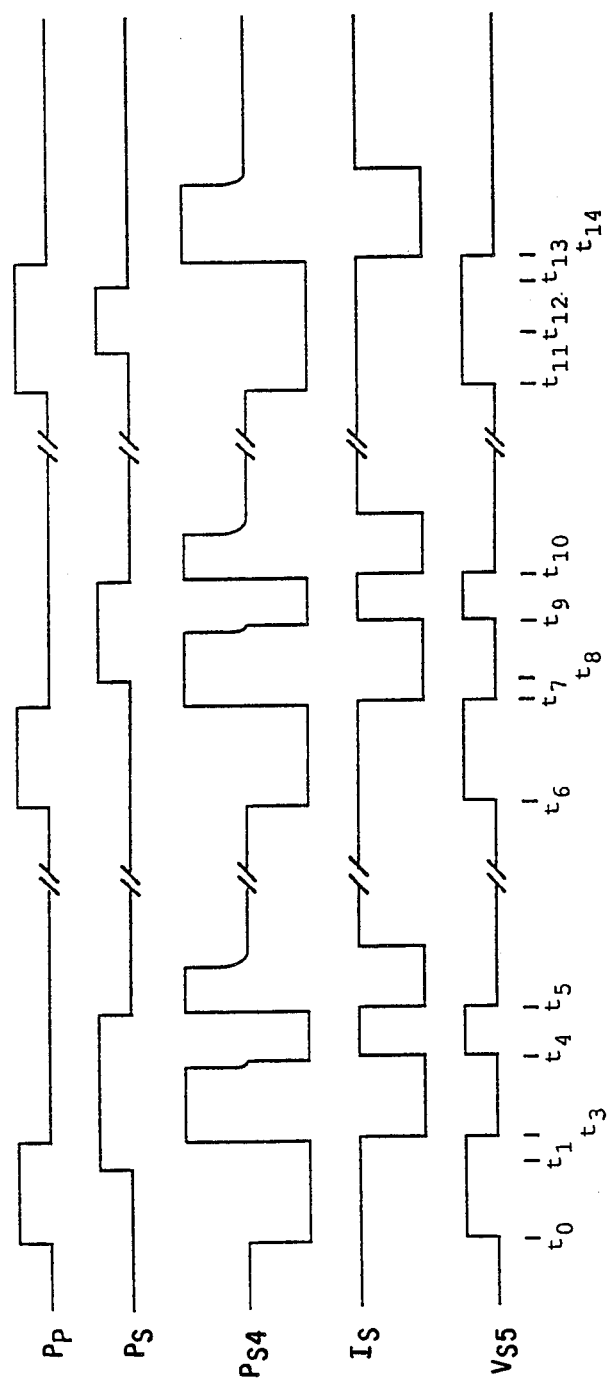
FIG. 6 is a diagram of the logic states of the input and output signals of the logic circuit in various implementations.

FIG. 6 is a diagram of the various signals occurring on the inputs and outputs of the logic circuit CL. This diagram shows, for specific configurations of the signals Pp and Ps, simultaneously occurring, the waveform VS4 at the output of the secondary ES4 of transformer TA, and the waveform VS5 at the output 25 of circuit CL.

In this diagram, one considers an initial configuration (time t0) when the transformer TA is demagnetized (the signal Is is set to a logic "1"). As soon as the signal Pp is set to "1", the signal VS5 is set to a logic "1" and the power transistor is ON.

Then, it is assumed that at the time t1 the signal Ps is also set to "1" while the signal Pp is still set to a logic "1". As shown by the curve VS5, with the circuit according to the invention, the signal VS5 is set to "0" at the end of the signal Pp independently of the signal Ps. It is only at the time t4, when the main transformer TA is demagnetized, that the conduction correlated with the presence of the signal Ps will be triggered for a time t4–t5 lower than the duration of this pulse Ps.

At the time t6, a signal Pp appears again while the transformer is demagnetized (Is being set to "1"). Therefore, a current conduction of the main transistor between the times t6 and t7 is obtained while the signal Pp is present. Should a signal Ps later appear at the time t8, then the main transformer TA is not demagnetized, the current conduction is delayed in order to start only at the time t9 until the time t10 (end of signal Ps).

The continuation of the sequence is achieved without any particular problem. However, it will be noted as regards the last pulse Pp, at the time t11, that a pulse Ps occurs at a time t12 while this pulse Pp is still present. Should the pulse Ps be completed at the time t13, this will not cause the main transistor to be switched OFF since, according to the instant invention, only the pulse which has caused the switching ON of the main transistor can cause its switching OFF. Thus, the main transistor stops being ON only at the time t14 when said pulse Pp is reset.

The main advantage of the invention is to permit the implementation of a switching power supply liable to indifferently operate according to two regulation modes, and provided with a demagnetization monitoring device which avoids utilizing expensive oversized components, while necessitating a limited number of active and passive components.

I claim:

1. A switching power supply comprising a primary regulation system (CI3) and a secondary regulation system (CI2, CI1), each of said systems being capable of supplying at the output (19, 17) signals (Pp, Ps) constituted by periodical square pulses of variable widths liable to be set to a first logic state ("0") corresponding to a switching off order of a main switch (Tp) and to a second logic state ("1") corresponding to a switching on order of this main switch, further comprising:

a comparison means (22), with respect to a low or null voltage value (23), for the output voltage (VS4) of a secondary winding (ES4), the output of the comparison means (22) supplying a signal (Is) being set to said second logic state "1") when the transformer and to said first logic state ("0") when said transformer is not demagnetized a logic circuit (CL) receiving the output signal (Is) of the comparison means (22), the output signal (Pp) of the primary regulation system and the output signal (Ps) of the secondary regulation system, this logic circuit supplying at its output (25) a control signal (VS5) of the main switch (Tp) which can be set to said first logic state ("0") for the switching OFF of the main switch or said second logic state ("1") for its switching ON, as a function of the following criteria:

the control signal is set to said second logic state ("1") if the output signal of the comparator is set to said second logic state ("1") and if the output signal of at least one of the regulators is set to said second logic state ("1"), the control signal is set to said first logic state ("0") when the output signal of the regulator which has caused the control signal to be set to said second logic state ("1") is reset.

2. A switching power supply according to claim 1, wherein said logic circuit (CL) comprises:

two logic circuits provided with an identical S/R flip-flop (B1, B2) each of which comprising a set input (S), a reset input (R) and a complementary output (Q*), a first AND gate (32) and a second AND gate (33), each of which is provided with two inputs, and a two-inputs OR gate (34), a set of connections so constituted that:

the signal (Is) arrives on both the rest inputs (R) of the circuits (B1, B2), the outputs of the first and second AND gates (32, 33) are respectively connected to the set inputs (S) of said flip-flops (B1, B2), the outputs (Q*) of the flip-flops (B1 and B2) are respectively connected to the inputs of the second (33) and first (32) AND gates.

the primary signal (Pp) arrives at the other input of the first AND gate (32), the secondary signal (Ps) arrives at the other input of the second AND gate (33), and the outputs of both AND gates are respectively connected to the two inputs of the OR gate (34), the output of which corresponds to the output point (25) of said logic circuit (CL).

3. A switching power supply comprising a transformer demagnetization monitoring device according to claim 2, wherein each of the logic S/R flip-flop circuits (B1, B2) is constituted by:

A D-type flip-flop (DI, D2) comprising data and clock inputs (D, CK) and true and complementary outputs (Q,Q*), a two-inputs AND gate (35, 37), a two-inputs OR gate (36, 38) and various connections so constituted that the data input (D) is connected to the complementary output (Q*), the true output (Q) is connected to one of the AND gate inputs (35, 37), the output of the AND gate (35, 37) is connected to one of the OR gate inputs (36, 38) and the OR gate output is connected to the clock input (CK), the other OR gate input (36, 38) constituting the set input (S) of the S/R flip-flop circuit (B1, B2), the other AND gate input (35, 37) constituting the reset input (R) of the S/R flip-flop circuit (B1, B2) and the complementary output (Q*) of the D-type flip-flop (D1, D2) constituting the complementary output (Q*) of the S/R flip-flop circuit (B1, B2).

* * * * *